UNITED STATES PATENT OFFICE

2,213,979

QUATERNARY AMMONIUM DERIVATIVES OF ALCOHOL AMINE COMPOUNDS

Albert K. Epstein and Morris Katzman, Chicago, Ill., assignors to The Emulsol Corporation, Chicago, Ill., a corporation of Illinois No Drawing. Application August 7, 1939, Serial No. 288,776

19 Claims. (Cl. 260—295)

This invention relates to new chemical compounds of the quaternary ammonium type which are characterized by possessing interface modifying properties rendering the same highly useful for the purposes for which such agents are employed in the various arts.

Many of the novel compounds are, in general, reaction products preferably of tertiary nitrogenous bases with halogeno-polycarboxylic esters of higher molecular weight ethers or esters of alcohol amines.

At least most of the compounds falling within the scope of this invention may be represented by the general formulae

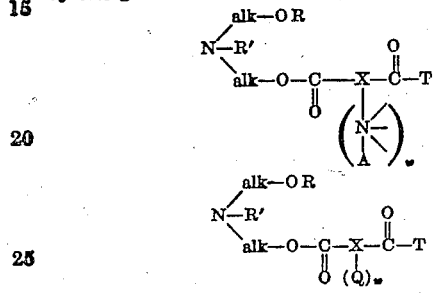

wherein "alk" is alkylene or arylene, for example, ethylene or phenylene, R is an organic radical containing preferably at least six carbon atoms, X is a hydrocarbon or substituted hydrocarbon residue of a polycarboxylic acid, containing preferably not more than eight carbon atoms, Q is a quaternary ammonium radical, A is an anion, T is (1) a member of the group NHR'' where R'' is hydrogen, lower alkyl, hydroxy-alkyl or cycloalkyl, or (2) OY where Y is a cation, lower alkyl, cycloalkyl or an aliphatic polyhydric alcohol radical, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member, and R' is a member selected from the group consisting of hydrogen, alkyl, cycloalkyl, alkylol, (alk—OR), and

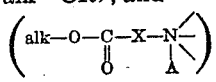

where alk, R, X, N and A have the foregoing significance, and $w$ is a small whole number, preferably one or two.

A more limited aspect of the compounds of the present invention, and which are particularly satisfactory for most of the purposes for which said compounds are adapted, is denoted by the general formula

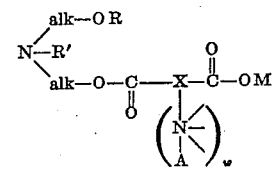

wherein "alk" is alkylene, R is an aliphatic acyl radical containing from 6 to 18 carbon atoms, X is the residue of an aliphatic dicarboxylic acid containing not more than eight carbon atoms, M is a cation, $w$ is one or two, A is halogen, R' is hydrogen, alkyl or alkylol, and the three indicated valence bonds attached to nitrogen are satisfied by a heterocyclic group such as pyridine, quinaldine or the like.

By the term "quaternary ammonium radical" we mean one containing a pentavalent nitrogen wherein four valences are satisfied by carbon and the fifth valence by an anion.

The radical R in the above formulae may be of aliphatic, cycloaliphatic, aromatic or aromatic-aliphatic character, and may contain substituent groups such as amino, hydroxy, halogen, sulphate, sulphonic, phosphate, carboxyl, nitrile, and the like, as will be pointed out hereinafter, but it is particularly preferred that it be unsubstituted aliphatic or fatty and contain from eight to eighteen carbon atoms. The radical "alk" and residue X may contain substituent groups such as those mentioned and the sequence of carbon atoms therein may be interrupted by O, S, C=O, NH, NR where R is alkyl, and the like.

Of particular utility are the reaction products of tertiary nitrogenous bases, such as pyridine, with lower molecular weight halogeno-dicarboxylic acid esters of fatty acid esters of alkylolamines, the fatty acid radical of which contains at least four but particularly from twelve to eighteen carbon atoms.

In order that the nature of the invention may become more apparent, there are listed hereinbelow representative compounds which fall within the scope of the invention:

(1) 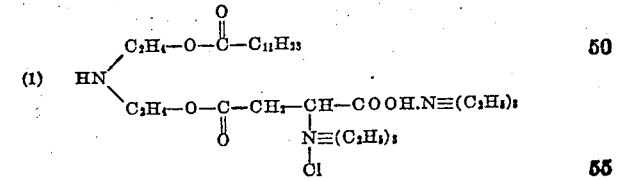

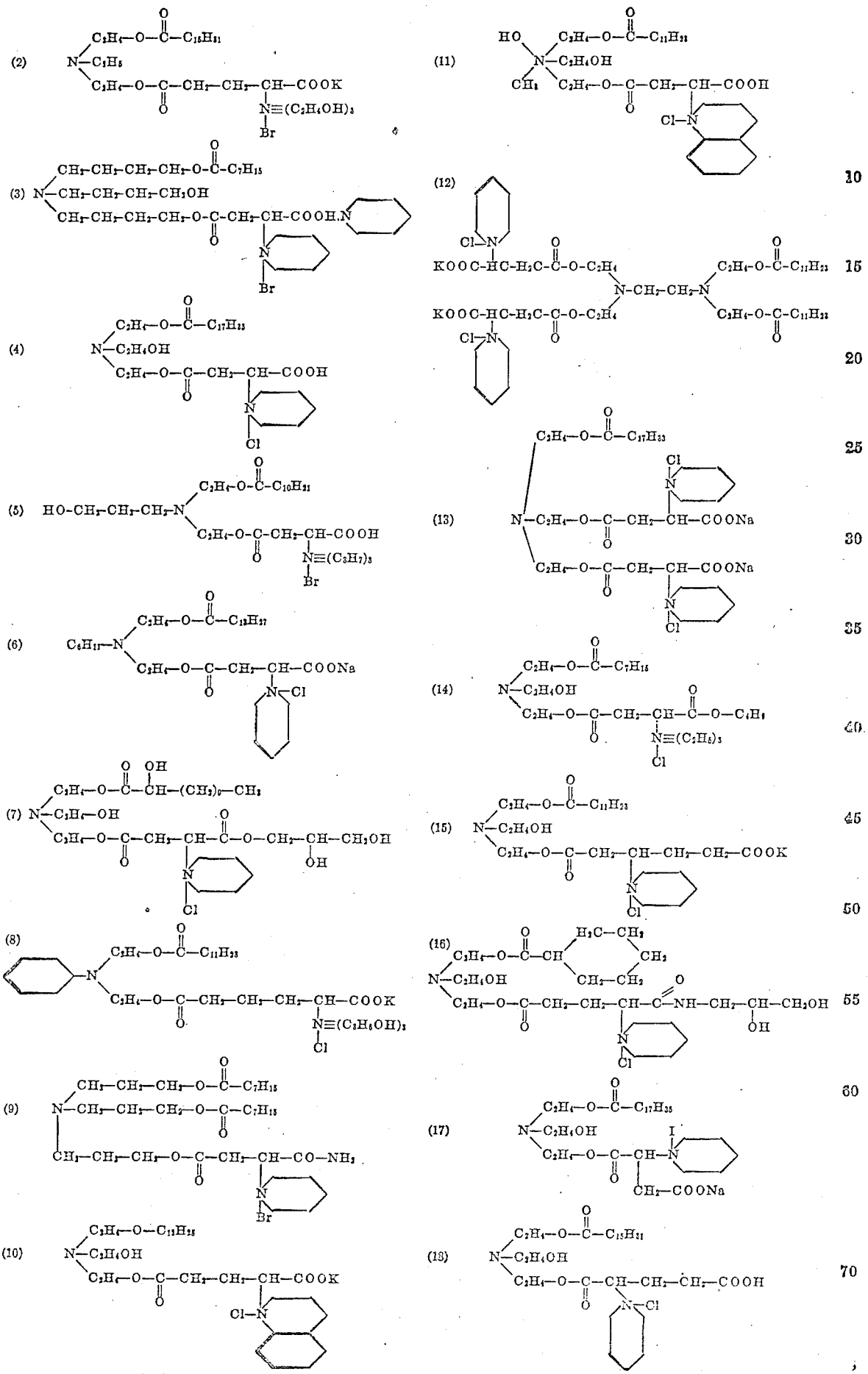

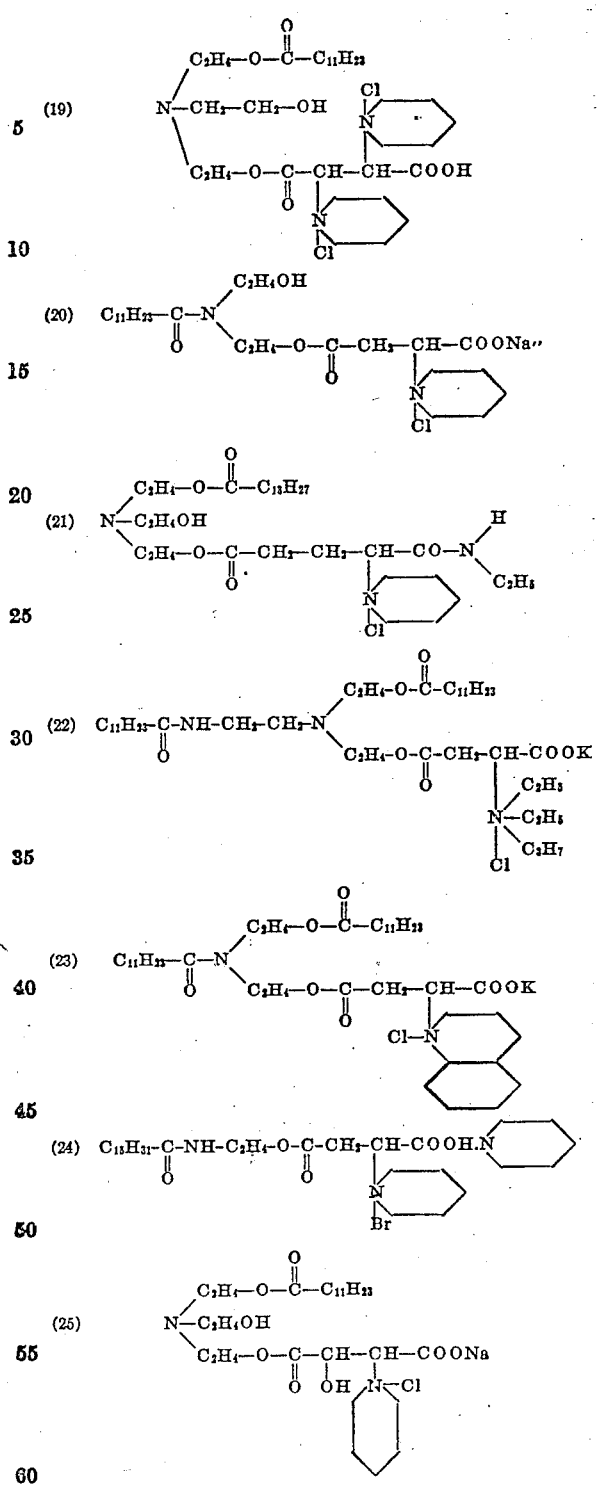

closed herein. It will be appreciated that other methods may be utilized, that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

(1) 3.5 grams of a mixture of mono and dicaprylic acid esters of triethanolamine and 2.8 grams of di-brom succinic anhydride were mixed together, the temperature spontaneously rising from 25 degrees C. to 95 degrees C. at which latter temperature the reaction mass was maintained for a period of 10 minutes.

(2) The reaction mass produced in part 1 hereof was cooled to room temperature and 5 cc. of pyridine were added thereto, mixed therewith, and allowed to stand for 24 hours. The reaction product was then washed with petroleum ether to remove excess pyridine. The final product, which was soluble in water and had foaming and wetting properties, contained a substantial proportion of a mixture of compounds having the following probable formulae:

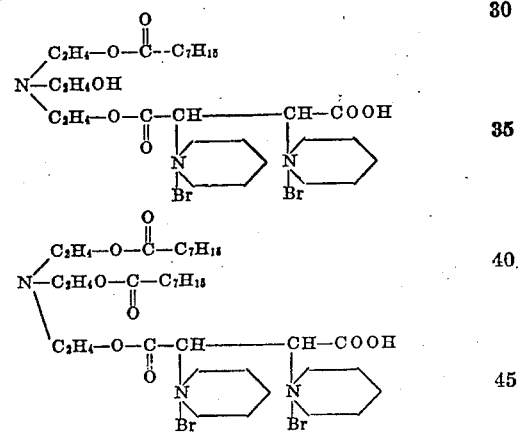

*Example B*

(1) 25.3 grams of the amide of monoethanolamine and coconut oil mixed fatty acids and 29 grams of di-brom succinic anhydride were heated together, with stirring, to 70 degrees C. The temperature spontaneously rose to 85 degrees C. and it was maintained between 85 degrees C. and 90 degrees C. for approximately 10 minutes.

(2) 5.43 grams of the reaction product of part 1 hereof and 5 cc. of pyridine were mixed together at room temperature, the temperature spontaneously rising to 40 degrees C. in about one-half hour. The mixture was allowed to stand for 24 hours. The reaction product was soluble in water, foamed in neutral and dilute acid solutions and contained a substantial proportion of a compound having the following probable formula:

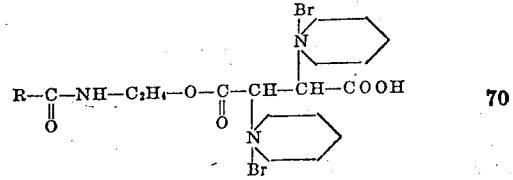

(3) 5.43 grams of the reaction product of part 1 hereof and 5 cc. of triethyl amine were mixed While the above examples represent single substances, it will be understood that, in practice, it is, in general, more advantageous to employ mixtures of any two or more thereof with or without diluents.

It should also be understood that while the compounds of the invention have been described hereinabove through the medium of chemical formulae, in many cases the final products are mixtures of different substances which are best and most accurately described in the form of reaction products of stated materials.

The following examples are illustrative of methods which have been found suitable for preparing various of the compounds which are distogether at room temperature, the temperature spontaneously rising to 80 degrees C. The mixture was allowed to cool to room temperature and then permitted to stand for a period of 24 hours. The resulting reaction product was soluble in water, had good foaming properties and contained a substantial proportion of a compound having the following probable formula:

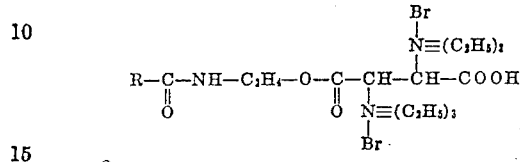

(R—C(=O) in the above formulae is the acyl radical of coconut oil mixed fatty acids.)

*Example C*

(1) 884 grams of corn oil and 200 grams of monoethanolamine were heated for 2 hours at a temperature between 160 degrees C. and 235 degrees C., a stream of carbon dioxide gas being continuously passed through the reaction mass.

(2) 150 grams of reaction product of part 1 hereof were washed twice, each time with 1200 cc. of boiling water, the mass being salted out after each washing. The salted out material, which comprised primarily the corn oil fatty acid amides of monoethanolamine, largely the oleic acid amide of monoethanolamine, was dried by heating to 145 degrees C. with stirring and, while hot, the sodium chloride was filtered off.

(3) 32.5 grams of the amide produced in part 2 hereof and 28 grams of di-brom succinic anhydride were warmed to 60 degrees C. The temperature spontaneously rose to 90 degrees C. at which temperature the reaction mass was held for about 10 minutes.

(4) 6 grams of the reaction product of part 3 hereof and 5 cc. of pyridine were mixed together at room temperature and allowed to stand for a period of 20 hours. The resulting product, which had foaming and wetting properties, contained a substantial proportion of a compound having the following probable formula:

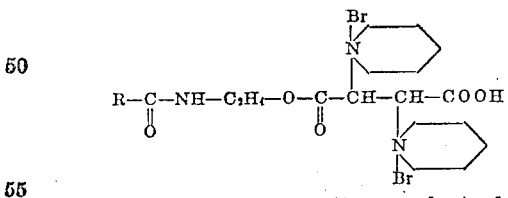

(5) 6 grams of the reaction product of part 3 hereof and 5 cc. of di-ethyl amino ethanol were mixed together and allowed to stand for a period of 24 hours. The reaction product, which had foaming and wetting properties, contained a substantial proportion of a compound having the following probable formula:

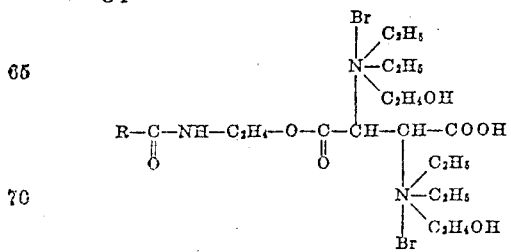

(R—C(=O) of the above formulae is the acyl radical of corn oil mixed fatty acids.)

*Example D*

(1) 250 grams of the coconut oil mixed higher fatty acid amides of monoethanolamine (consisting largely of the lauric acid amide of monoethanolamine) and 110 grams of maleic anhydride were mixed together and heated to 100 degrees C. for a few minutes, with stirring.

(2) To 180 grams of the reaction product of part 1 hereof, 1020 grams of a 5.5% solution of sodium hypochlorite were added and the mixture was stirred for approximately 2 hours while maintaining the same in an ice bath. The resulting product was then mixed with a solution containing 500 cc. of cold water and 300 grams of sodium chloride and, while mixing, 25 cc. of concentrated hydrochloric acid were added. The purpose of the addition of the hydrochloric acid was to liberate the free carboxylic acid derivative so that it would separate out from the reaction mass in the form of an oily layer. The wash water was then drawn off and the remaining oily layer was washed with a solution containing 1200 cc. of cold water and 300 grams of sodium chloride after which said wash water was again drawn off. The remaining said oily layer was then dissolved in ethyl ether and anhydrous sodium sulphate was added thereto to dry the product, the mass was filtered and the ether evaporated in vacuo on a hot water bath. The residue contained a substantial proportion of a compound having the following probable formula:

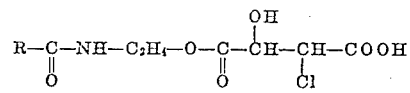

(3) 8 grams of the reaction product of part 2 hereof and 5 cc. of pyridine were mixed together and allowed to stand for 24 hours. The excess pyridine was then washed out of the product with petroleum ether. The residue, insoluble in petroleum ether, was soluble in water, had foaming and wetting properties, and contained a substantial proportion of a compound having the following probable formula:

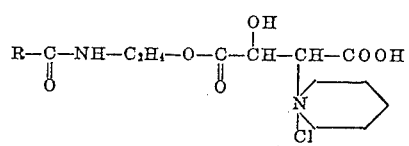

(4) 8 grams of the reaction product of part 2 hereof and 10 cc. of a 25% ethyl alcohol solution of trimethyl amine were mixed together and allowed to stand for 24 hours. The alcohol and the excess trimethyl amine were then evaporated in vacuo from the reaction product. The residue, which was soluble in water and had foaming and wetting properties, contained a substantial proportion of a compound having the following probable formula:

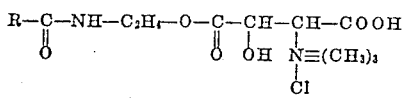

*Example E*

(1) 10 grams of the mono-lauric acid ester of tri-isopropyl amine and 8 grams of di-brom succinic anhydride were mixed together, the temperature spontaneously rising from 30 degrees C. to 70 degrees C. The reaction mass was then heated to 90 degrees C. at which temperature it was held for about 5 minutes.

(2) The reaction product of part 1 hereof was cooled to 30 degrees C. and 5 cc. of pyridine were added thereto, with stirring, the mass then being allowed to stand for about 24 hours. The final reaction product, which had foaming and wetting properties, contained a substantial proportion of a compound having the following probable formula:

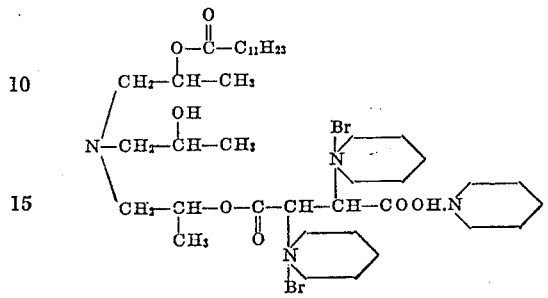

It is, of course, clear that methods other than those described may be employed for producing the novel compounds of this invention. Furthermore, the order of reacting the ingredients may be modified as will be apparent to those skilled in the art.

Instead of initially producing, for example, the higher fatty acid ester of triethanolamine and then reacting with chlorsuccinyl chloride or the like in the presence of pyridine or similar tertiary base, the higher fatty acid radical may be introduced subsequently to the introduction of the quaternary ammonium group by reaction with a higher fatty acid halide or the like. Thus, for example, an alcohol amine such as triethanolamine may be reacted with chlorsuccinyl chloride in such proportions as to esterify one or more hydroxy groups, and with pyridine to produce the quaternary ammonium derivative, leaving free at least one triethanolamine hydroxy group. The resulting quaternary ammonium derivative may then be isolated and purified or reacted in the impure state but in dry form with an equivalent amount of a long chain or higher molecular weight acyl halide to esterify the remaining free hydroxy group.

Again, as indicated, a higher fatty acid ester of triethanolamine or the like may be reacted with an unsaturated polycarboxylic acid or anhydride, such as maleic acid, maleic anhydride or fumaric acid. To the resulting compound, in this case ester, halogen may be introduced into the polycarboxylic acid radical at the double bond thereof by means of a halogen acid or hypohalogen acid such as hydrochloric acid, hydrobromic acid, hypochlorous acid, hypobromous acid or the like or by chlorine or bromine directly, and the resulting compound may be treated with trimethyl amine, pyridine, quinaldine, or other tertiary base to produce the final quaternary ammonium compound.

In some cases, hydrogen attached to nitrogen may be connected to a higher molecular weight organic radical such as represented by R, so as to form amides, as illustrated by Formulae 20, 22, 23 and 24 in the list of compounds shown hereinbefore. In at least certain cases, these compounds function similarly to those wherein a higher molecular weight or lipophile radical is attached at an hydroxy group of the alcohol amine to form an ether or ester.

In those cases where a tertiary alcohol amine, such as triethanolamine, tripropanolamine or the like is employed, it is clear, of course, that esters only can be formed by reacting the same with chlorsuccinic acid, chlorsuccinyl chloride, higher molecular weight fatty acids or their acyl halides or the like. In the case of such reactions wherein primary and secondary alcohol amines, such as monoethanolamine or diethanolamine, are employed, mixtures of amides and esters usually result, in many cases the amides preponderating.

In certain instances, as indicated, by way of illustration, in Examples 4, 5, 11, 18 and 19, a free carboxyl group may be present in the compounds. Such compounds may be further reacted to esterify or amidify the free carboxyl group to convert the same into the groups —CONH₂, —CONHR, and COOR where R is preferably lower molecular weight alkyl or cycloalkyl such as ethyl, butyl, cyclohexyl, and the like, which may contain substituent groups such as halogeno, hydroxy, amino, cyanogen and the like. In the case of the ester linkage, that is, the —COOR group, the radical R may be that of a polyhydric alcohol or polyhydroxy substance such as glycerol, glycols, and polyglycols such as ethylene glycol, propylene glycol, butylene glycol, diethylene glycol, polyglycerols, and the like. Such derivatives have particularly desirable properties in the technical and industrial arts. The usual amidification and esterification procedures can readily be adapted by the skilled chemist to the preparation of such derivatives.

The higher molecular weight organic radical represented by R in the general formula set forth hereinabove may be derived from various sources. Such sources include, for example, straight chain and branched chain higher molecular weight carboxylic, aliphatic, and fatty acids, saturated and unsaturated, such as caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oil, whale oil, shark oil, partially or completely hydrogenated animal and vegetable oils such as those mentioned; hydroxy and alpha-hydroxy higher aliphatic and fatty acids such as 1-hydroxy stearic acid, dihydroxystearic acid, alpha-hydroxy stearic acid, alpha-hydroxy pamitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives such as amino, halogen, hydroxy, sulphate, sulphonic, phosphate and the like substitution and addition derivatives of the aforementioned carboxylic substances. It will be understood that mixtures of any two or more of said acids may be employed if desired.

In those cases where higher molecular weight ethers are prepared, the higher molecular weight organic radical may be derived from alcoholates of alcohols corresponding to the higher molecular weight acids referred to hereinabove.

The alcohol amines which provide, in part, the linkage between the higher molecular weight group and the quaternary ammonium radical may be selected from a large class and include primary, secondary and tertiary alcohol amines and alkylolamines, symmetrical and unsymmetrical, normal and iso-derivatives, such as monoethanolamine, diethanolamine, triethanolamine and mixtures thereof such as occur in the so-called commercial triethanolamine, monoethyl diethanolamine, tripropanolamine, dipropanolamine, monopropanolamine, dibutanolamine, tributanolamine, monobutanolamine, monopentanolamine, dipentanolamine, trihexanolamine, monohexanolamine, trilauroylamine, trihexadecylolamine, N-cyclohexyl dibutanolamine, diethanolaniline, monoethyl dipropanolamine, triethanol methyl ammonium hydroxide, diethanolamine cyclohexylamine, monobutyl diethanolamine, di-ethanol methyl amine, primary, secondary and tertiary alkylolamines of other mono- or polyvalent alcohols such as glycols, glycerol, sugars and sugar alcohols such as sorbitol, alkylol polyamines such as alkylol derivatives of ethylene diamine, diethylene triamine and tri-ethylene tetra-amine, arylol amines such as N-phenyl diethanolamine and the like.

The unsaturated polycarboxylic acids, their anhydrides and esters, and the halogeno-polycarboxylic acids or other derivatives thereof, in the form of their esters with ethyl alcohol or the like, which are reacted with the alcohol amines or the higher esters or amides of said alcohol amines may be selected from a relatively large class including aliphatic and aromatic compounds such as, for example, maleic acid, maleic anhydride, ethyl maleate, fumaric acid, monochlor succinyl chloride, di-chlor succinyl chloride, mono-chlor succinic acid, di-chlor succinic acid, ethyl chlor-succinate, di-chlor glutaryl chloride, and the corresponding derivatives of malonic acid, citraconic acid, mesaconic acid, itaconic acid, mucic acid, adipic acid, pimelic acid, sebacic acid, suberic acid, azelaic acid, aconitic acid, phthalic acids, and the like. Of particular utility are maleic acid, fumaric acid, ethyl maleate, and maleic anhydride.

The anion represented by the letter "A" in the general formulae illustrating the novel reagents of this invention is preferably a solubilizing anion such as chlorine, bromine or iodine. Other anions may be substituted therefor as, for example, $OH^-$, $HSO_4^-$, $RSO_4^-$, $C_6H_5SO_3^-$, $NO_3^-$, acetate, propionate, caproate, laurate, oleate, stearate, borate, phosphate, or some other organic or inorganic anion. As a general rule, the halogeno derivatives are particularly satisfactory.

The pentavalent nitrogen present in the novel substances of the present invention may be introduced into the molecule by means of various tertiary organic nitrogenous bases as, for example, alcohol amines and alkylolamines, aralkylol- and tertiary amines including triethanolamine and mixtures thereof such as, for example, present in so-called commercial triethanolamine, tripropanolamine, tributanolamine, tripentanolamine, trihexanolamine, triglycerolamine, dibutyl ethanolamine, diethanol ethyl amine, cyclohexyl diethanolamine, diethanol aniline, alkylol polyamines such as alkylol derivatives of ethylene diamine, dimethyl monoethanolamine, diethyl monopropanolamine, alkylamines such as triethyl amine, tripropyl amine, tributyl amine, diethylhexylamine, aromatic and heterocyclic bases such as tribenzylamine, di-cyclohexyl-aniline, pyridine, alkyl pyridines such as methyl-pyridine, quinoline, quinaldine, nicotine, and homologues and derivatives or substitution products thereof; mixtures of any two or more thereof and the like. It will be understood that these organic bases, as in the case of triethanolamine, for example, may be employed in pure, impure, or commercial form.

It will be understood that by varying the molal ratios of the reacting ingredients, products of variable character may be produced. Thus, for example, the monolauric acid ester of triethanolamine may be reacted with one or more mols of a halogeno-poly-carboxylic acid halide or the like and with one or more mols of pyridine or similar tertiary amines. All of the products, however, have surface modifying characteristics enabling their use for various of the functions hereinafter set forth.

The compounds of this invention have utility in various arts in which interface modifying agents are employed. They are resistant to precipitation by calcium and magnesium salts and are compatible with acid and alkali media. They may be utilized in the textile and related industries wherein they function for softening, wetting, detergent, emulsifying, penetrating, dispersing, frothing and foaming purposes. The textiles, the treatment of which with the agents of the present invention is rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of the present invention may be placed is for the treatment of paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes, particularly for the separation of silica from ores containing the same. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water-in-oil type which are encountered in oil-field operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial laundering and washing operations with marked advantage.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulpho-carboxylic acid esters of higher molecular weight alcohols such as lauryl sodium sulphoacetate, dioctyl sodium sulpho-succinate, dilauryl potassium sulphoglutarate, lauryl triethanolamine sulphoacetate, and the like; sulphuric and sulphonic derivatives of condensation products of alkylolamines and higher fatty acids; phosphoric, pyrophosphoric and tetraphosphoric acid esters of higher molecular weight alcohols; Turkey-red oils; compounds of the type of isopropyl naphthalene sodium sulphonate, and other classes of wetting agents.

It will be understood that the products may be employed in the form of impure reaction mixtures containing substantial proportions of the effective interface modifying agent or agents or, if desired, for any particular purposes, purification procedures may be employed to produce pure or substantially pure products. Those versed in the art will be familiar with the types of purification methods which may be employed with advantage herein, particularly in the light of the disclosure made hereinabove.

Wherever the term "higher" is employed as referring to higher molecular weight acids or the like, it will be understood to cover compounds or radicals having at least six carbon atoms unless otherwise specifically stated.

What we claim as new and desire to protect by Letters Patent of the United States is:

1. Quaternary ammonium chemical compounds corresponding to the formula

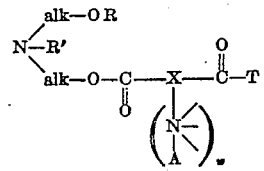

wherein "alk" is alkylene, R is an organic radical containing at least six carbon atoms, X is a residue of a polycarboxylic acid, A is an anion, T is (1) a member of the group NHR'' where R'' is hydrogen, lower alkyl, hydroxy-alkyl or cycloalkyl, or (2) OY where Y is a cation, lower alkyl, cycloalkyl or an aliphatic polyhydric alcohol radical, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member, R' is a member selected from the group consisting of hydrogen, alkyl, cycloalkyl, alkylol, (alk-OR), and

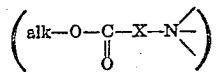

where

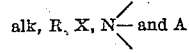

have the foregoing significance, and w is a small whole number.

2. Quaternary ammonium chemical compounds corresponding to the formula

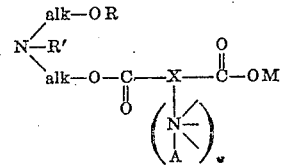

wherein "alk" is alkylene, R is an aliphatic acyl radical containing from 6 to 18 carbon atoms, X is a residue of an aliphatic dicarboxylic acid containing not more than eight carbon atoms, A is halogen, M is a cation, w is one or two, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member, and R' is a member selected from the group consisting of hydrogen, alkyl, cycloalkyl, alkylol, (alk-OR) and

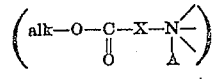

where

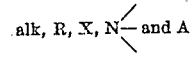

have the foregoing significance.

3. Quaternary ammonium chemical compounds corresponding to the formula

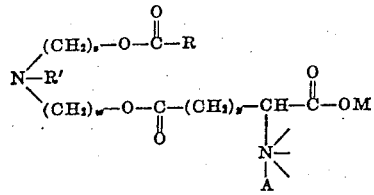

wherein R is a hydrocarbon radical containing from five to seventeen carbon atoms, A is an anion, M is a cation, the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member, $w$, $v$ and $y$ are integers ranging from two or four, R' is a member selected from the group consisting of hydrogen, alkyl, cycloalkyl, alkylol,

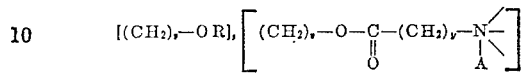

wherein

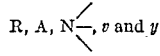

have the foregoing significance.

4. Chemical compounds corresponding to the formula

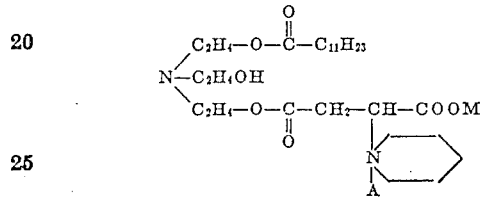

wherein A is halogen and M is a cation.

5. A method of preparing quaternary ammonium derivatives of the class consisting of polycarboxylic acid esters of higher molecular weight ethers and esters of alcohol amines, which comprises interacting a tertiary nitrogenous base, a member selected from the group consisting of halogeno-polycarboxylic acids, anhydrides and halides thereof, and a member selected from the group consisting of higher molecular weight ethers and esters of alcohol amines.

6. A method of preparing quaternary ammonium derivatives of higher molecular weight fatty acid esters of tertiary alcohol amines, which comprises interacting a tertiary nitrogenous base, a member selected from the group consisting of aliphatic halogeno-dicarboxylic acids, anhydrides and halides thereof, containing not more than eight carbon atoms, and a higher molecular weight fatty acid ester of a tertiary alcohol amine.

7. A method of preparing quaternary ammonium derivatives of the class consisting of mono- and di-higher molecular weight fatty acid esters of triethanolamine, which comprises interacting a tertiary nitrogenous base, a member selected from the group consisting of halogeno-succinic acids, anhydrides and halides thereof, and a member selected from the group consisting of mono- and di-higher molecular weight fatty acid esters of triethanolamine.

8. A method of preparing quarternary ammonium derivatives of the class consisting of mono- and di-higher molecular weight fatty acid esters of triethanolamine, which comprises interacting pyridine, chlorsuccinyl chloride, and a member selected from the group consisting of mono- and di-higher molecular weight fatty acid esters of triethanolamine, the higher molecular weight fatty acid acyl radical of which contains from 12 to 18 carbon atoms.

9. Quaternary ammonium chemical compounds corresponding to the formula

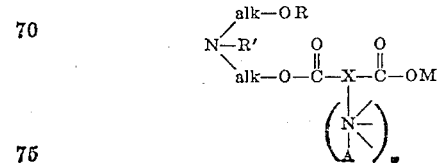

wherein "alk" is a member selected from the group consisting of alkylene and arylene, substituted or interrupted, R is an organic radical containing at least six carbon atoms, X is a member selected from the group consisting of hydrocarbon and substituted hydrocarbon residues of polycarboxylic acids, A is an anion, M is a cation, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member, $w$ is small whole number, and R' is a member selected from the group consisting of hydrogen, alkyl, cycloalkyl, alkylol, (alk-OR) and

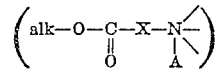

where

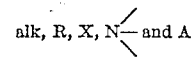

have the foregoing significance.

10. Oxyalkylamines containing at least two oxy groups, at least one of said oxy groups being directly linked to a member selected from the group consisting of higher molecular weight alkyl and carboxylic acyl radicals, and at least one of said oxy groups of the oxyalkylamine being directly linked to a polycarboxylic acid through a carbonyl group of said polycarboxylic acid, there being at least one quaternary ammonium radical linked to a carbon atom of the carbon chain of the alkyl portion of the polycarboxylic acid radical.

11. Tertiary oxyalkylamines containing at least two oxy groups, at least one of said oxy groups being directly linked to a higher molecular weight fatty acid acyl radical, and at least one of said oxy groups of the oxyalkylamine being directly linked to succinic acid through a carbonyl group of said succinic acid, there being at least one quaternary ammonium radical linked to a carbon atom of the carbon chain of the alkyl portion of the succinic acid radical.

12. Tertiary oxyalkylamines containing at least two oxy groups, at least one of said oxy groups being directly linked to a higher molecular weight carboxyl acyl radical, and at least one of said oxy groups of the oxyalkylamine being directly linked to an aliphatic dicarboxylic acid through a carbonyl group of said dicarboxylic acid, there being a heterocyclic quaternary ammonium radical linked to a carbon atom of the carbon chain of the alkyl portion of the aliphatic dicarboxylic acid radical.

13. Tri-oxyethylamine, at least one oxy group of which is directly linked to a fatty acid acyl radical containing from six to eighteen carbon atoms, and at least one oxy group of the tri-oxyethylamine being directly linked to succinic acid through a carbonyl group of said succinic acid, there being a quaternary pyridine group linked to a carbon atom of the carbon chain of the alkyl portion of the succinic acid radical.

14. An oxy-alkylamine, an oxy group of which is directly linked to an aliphatic polycarboxylic acid through a carbonyl group of said polycarboxylic acid, said polycarboxylic acid containing from three to eight carbon atoms and there being at least one quaternary ammonium radical linked to a carbon atom of the carbon chain of the alkyl portion of the polycarboxylic acid radical, a higher molecular weight carboxylic acid acyl group also being present in the molecule and linked directly to the oxy-alkylamine through a linkage selected from the group consisting of ester and amide linkages.

15. An oxy-alkylamine, an oxy group of which is directly linked to succinic acid through a carbonyl group of said succinic acid, there being a quaternary ammonium radical linked to a carbon atom of the carbon chain of the alkyl portion of the succinic acid radical, a fatty acid acyl group, containing from twelve to eighteen carbon atoms, also being present in the molecule and linked directly to the oxy-alkylamine through a linkage selected from the group consisting of ester and amide linkages.

16. An oxy-alkylamine, an oxy group of which is directly linked to a polycarboxylic acid radical through a carbonyl group of said polycarboxylic acid, there being at least one quaternary ammonium group linked to a carbon atom of the carbon chain of the alkyl portion of the polycarboxylic acid radical, there also being present in the molecule an aliphatic radical having a chain of at least six carbon atoms and which is linked directly to the oxy-alkylamine.

17. Chemical compounds in accordance with claim 16 wherein the polycarboxylic acid radical is that of an aliphatic dicarboxylic acid containing not more than eight carbon atoms.

18. An oxy-alkylamine, an oxy group of which is directly linked to a lower molecular weight aliphatic dicarboxylic acid through a carbonyl group of said dicarboxylic acid, there being a quaternary ammonium group linked to a carbon atom of the carbon chain of the alkyl portion of the dicarboxylic acid radical, a higher fatty acid acyl group also being present in the molecule and linked directly to the oxy-alkylamine through a linkage selected from the group consisting of ester and amine linkages.

19. An oxy-alkylamine, an oxy group of which is directly linked to succinic acid through a carbonyl group of said succinic acid, there being a quaternary ammonium radical linked to a carbon atom of the carbon chain of the alkyl portion of the succinic acid radical, a higher molecular weight aliphatic acyl radical also being present in the molecule and linked directly to the oxy-alkylamine through a linkage selected from the group consisting of ester and amide linkages.

ALBERT K. EPSTEIN.
MORRIS KATZMAN.